(No Model.)
H. B. CROSS.
EQUALIZING DEVICE FOR VEHICLES.
No. 497,309. Patented May 16, 1893.
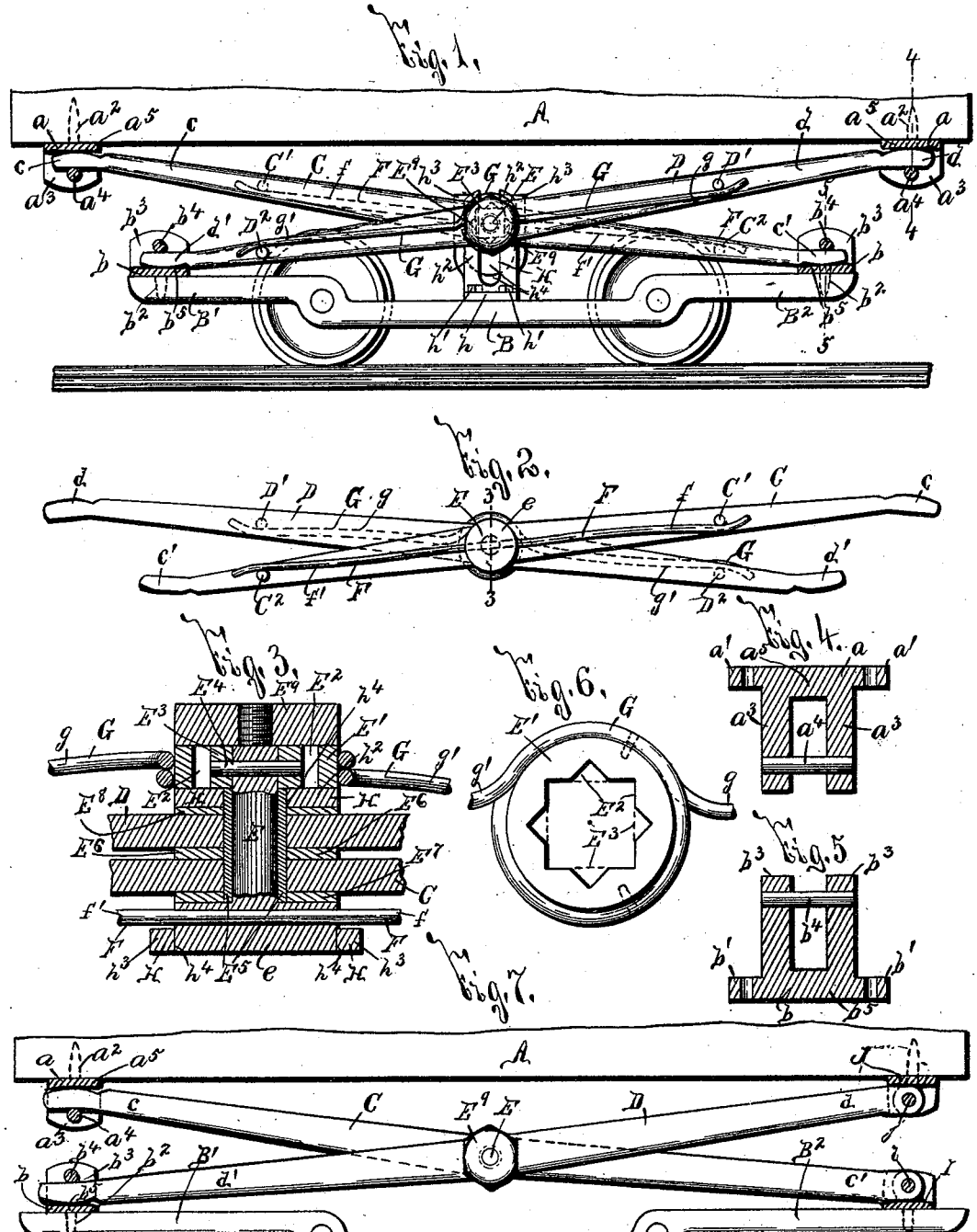
WITNESSES:
H. E. Chase
C. Schoeneck
INVENTOR
Henry B. Cross
BY
Hey Wilkinson & Parsons
ATTORNEYS

UNITED STATES PATENT OFFICE.

HENRY B. CROSS, OF SYRACUSE, NEW YORK.

EQUALIZING DEVICE FOR VEHICLES.

SPECIFICATION forming part of Letters Patent No. 497,309, dated May 16, 1893.

Application filed June 25, 1892. Serial No. 437,973. (No model.)

*To all whom it may concern:*

Be it known that I, HENRY B. CROSS, of Syracuse, in the county of Onondaga, in the State of New York, have invented new and useful Improvements in Equalizing Devices for Vehicles, of which the following, taken in connection with the accompanying drawings, is a full, clear, and exact description.

My invention relates to improvements in equalizing devices for vehicles, and particularly electric surface cars, and has for its object the production of a simple, practical and effective device for equalizing the weight or pressure upon the car or body of the vehicle, effecting a uniform up and down movement of both of its extremities and preventing lengthwise rocking of the same: and to this end it consists, essentially, in a pair of levers or bars extending diagonally across each other with their lower ends mounted on the truck for carrying the car or body, and their upper ends connected to said body and a connection between the central portions of said levers.

The invention furthermore consists in the detail construction and arrangement of the parts, all as hereinafter more particularly described and pointed out in the claims.

In describing this invention, reference is had to the accompanying drawings, forming a part of this specification, in which, like letters indicate corresponding parts in all the views.

Figure 1 is an elevation, partly in section, of the detached lower portion of a car, a truck, and my improved invention connecting the car and the truck. Fig. 2 is a rear elevation of the detached equalizing bars or levers of my invention, shown at Fig. 1, their adjacent ends being somewhat approximated. Fig. 3 is a transverse vertical sectional view, taken on line 3—3, Fig. 1. Figs. 4 and 5 are transverse vertical sectional views, taken on lines 4—4, and 5—5, Fig. 1. Fig. 6 is an enlarged elevation of the detached central portion of one of the springs and its support, for the equalizing levers shown at Figs. 1, 2 and 3; and Fig. 7 is an elevation of a modified form of my invention.

It is well known that all vehicles, and particularly electric cars, are greatly inclined to rock vertically, especially when the weight at one extremity exceeds that at the other. My present invention is designed to entirely obviate this undesirable action and is of such simple construction and arrangement that it may be readily and economically applied to vehicles and cars now in use, or may be applied to cars and vehicles in their manufacture.

—A— represents a car or vehicle body which is of any desirable form, size and construction, and —B— a truck or gear which is also of any desirable form, size and construction.

—a—a— are suitable bearings or supports secured to the base of the car —A—. As best illustrated at Fig. 4, these bearings consist of laterally extending ears —$a'$—$a'$— secured by clamps —$a^2$—$a^2$— to the car, downturned supporting ears —$a^3$—$a^3$— and a pin or cross bar —$a^4$— between the lower ends of said ears. —b—b— are similar supports or bearings mounted on the truck or gear —B— and preferably upon laterally extending arms —B'— $B^2$— thereof. These supports or bearings —b— —b— are of similar construction to the bearings —a—a— and are formed with lateral ears —$b'$—$b'$—, downturned ears —$b^3$— $b^3$—, cross bars or pins —$b^4$— corresponding to the like parts —$a'$—$a'$—, —$a^3$—$a^3$— and —$a^4$— of the supports or bearings —a—a—. Suitable clamps —$b^2$—$b^2$— secure the ears —$b'$—$b'$— to the truck or gear —B—.

—C—D— are the equalizing levers of my invention so arranged as to diagonally cross each other at their central portions. These levers are formed at their opposite extremities with substantially horizontally extending ends —c—$c'$— and —d—$d'$—. As clearly shown in the drawings, the end —c— of the lever —C— is passed between the base bar —$a^5$— of the left hand support or bearing —a— and the pin or cross bar —$a^4$— thereof and the end —$c'$— is passed between the corresponding parts —$b^5$—$b^4$— of the right hand support or bearing —b—. The ends —d—$d'$— of the lever —D— are respectively passed through the corresponding parts —$a^5$—$a^4$— and —$b^5$—$b^4$— of the right hand support or bearing —a— and the left hand support or bearing —b—.

—E— is a bolt or clamp for screwing together the central portions of the levers —C— D— in order that their opposite extremities may approximate or separate as the car is depressed or elevated. At Figs. 1 and 2 this bolt is shown as so arranged that the lower ends or arms of the levers —C—D— are shorter than the opposite or upper ends or arms of said levers. As the opposite ends approximate or separate, they slide lengthwisely within their supports or bearings —a—a—, —b—b—. To facilitate the action of these levers and to support them in their operative position, and give them a certain yielding movement, I provide springs —F—G— which may be of any desirable form, size and construction to produce the desired result. As here illustrated, the spring —F— is shown as passed through the head —e— of the bolt —E— and its opposite extremities or arms —f—f'— are extended lengthwisely along the corresponding ends of the lever —C— and engage at their free ends, respectively the under side of a pin —C'— and the top side of a pin —$C^2$— upon said ends of the lever —C—. The spring —G— is wound around a shoulder —E'— upon the bolt —E— and is also provided with arms —g—g'— extending lengthwise of the corresponding extremities of the lever —D— and passed, respectively, under a pin —D'— and over a pin —$D^2$— upon the corresponding ends of the lever —D—.

To add to the utility of my invention, the spring supporting shoulder —E'— is preferably adjustable and is formed with an angular central opening —$E^2$— adapted to removably engage an angular shoulder —$E^3$— rigidly secured to the bolt—E—by a removable pin —$E^4$—. If desired to adjust the springs —F—G—, the spring supporting shoulder —E'— is partially rotated around the fixed shoulder —$E^3$— and the adjacent arms of said springs are either separated or approximated according to the direction of rotation of said shoulder —E'—. These springs —F—G— serve to normally separate the levers —C—D— to their utmost and as the car becomes weighted and the adjacent ends of the levers are approximated the springs are compressed, as shown at Fig. 2.

As the adjacent ends of the levers —C—D— are approximated, or separated, the bolt —E— is either depressed or elevated and to guide the same in its movement, I deem it advisable to use a guide —H— which also may be of any desirable form, size and construction. As here illustrated, this guide is formed with laterally extending feet —h— secured by clamps —h'— to the truck or gear —B— and with upwardly extending ears —$h^2$—$h^3$— formed with slots —$h^4$—$h^4$—. The ear —$h^2$— is interposed between the shoulders —E'— and —$E^3$— and a washer —$E^8$—, on the bolt and the ear —$h^3$— receives the bolt head —e—.

—$E^5$— is a bushing or sleeve encircling the portion of the bolt —E— carrying the levers —C—D—, and, —$E^6$—, —$E^7$—, —$E^8$— are washers interposed, respectively, between the adjacent faces of the levers —C—D—, of the lever —C—, and the nut —e— of the bolt —E—, and of the lever —D—, and the ear —$h^2$— of the guide —H—.

A clamping nut —$E^8$— movable on the end of the bolt —E— serves to secure said bolt in position and when desired to either adjust the springs —F—G—, or to remove the sleeve —$E^5$—, said nut may be readily withdrawn.

At Fig. 7 I have shown a modified form of my invention, in which, the lower end —c'— of the lever —C— is hinged upon a pivot —i— on a support or bearing —I— on the truck or gear —B— and its other or upper end —c— is free to slide in a support —a— of similar construction to the one previously described. In this view, the upper end —d— of the lever —D— is similarly hinged to a pivot —j— of a support —J— upon the car or vehicle body, and its lower end —d'— is free to slide in the bearing or support —b— on the truck or car —B— of similar construction to the bearing —b— previously described. It will be noted, however, that both of these levers are shown as of equal length and in this case, I prefer to dispense with the springs —F—G— and with the guide —H—. It will be understood, however, that the usual springs are interposed between the car or vehicle body and the truck or gear, and as these springs are compressed by the weight or pressure within the car or vehicle body, the adjacent ends of the levers —C—D— are approximated and their ends —c—d'— slide lengthwisely in the bearings or supports —a—b—.

The operation of my invention will be readily perceived from the foregoing description and upon reference to the drawings, and it will be particularly noted that the parts are simple in construction and operation, are cheaply manufactured and readily attached in position and entirely obviate the up and down movement of a car occasioned either by passing over a rough road bed or by the subjection of one of its ends to a weight greater than that at the other end, and that the up and down movement at each end of the vehicle is uniform and easy. It is evident, however, that the construction and arrangement of the parts of my improved equalizing bars or levers may be somewhat changed from that described and shown, as for instance, the form and arrangement of the springs —F—G— may be greatly varied, or, as shown at Fig. 7, these springs may be entirely omitted; the construction of the guide —H— may also be changed, or this part may, in some cases, also be omitted; hence I do not herein limit myself to the precise detail construction and arrangement of the parts of my invention.

Having thus fully described my invention, what I claim as new, and desire to secure by Letters Patent, is—

1. In an equalizing device for vehicles, the combination of a truck, a body, a pair of diagonally crossing levers arranged in a vertical plane at one longitudinal side of the vehicle with their central portions hinged together, their upper ends loosely connected to the body, and their lower ends loosely connected to the truck, and a second pair of levers arranged in a vertical plane at the opposite longitudinal side of the vehicle with their central portions hinged together, their upper ends loosely connected to the body, and their lower ends loosely connected to the truck, substantially as and for the purpose set forth.

2. In an equalizing device for vehicles, the combination of a truck, a body, a pair of diagonally crossing levers arranged in a vertical plane at one longitudinal side of the vehicle with their central portions hinged together, their upper ends loosely connected to the body, and their lower ends loosely connected to the truck, a second pair of levers arranged in a vertical plane at the opposite longitudinal side of the vehicle with their central portions hinged together, their upper ends loosely connected to the body and their lower ends loosely connected to the truck, hinge pins, for the central portions of said levers and guides for the hinge pins of said levers, substantially as and for the purpose specified.

3. In an equalizing device for vehicles, the combination of a truck, a body, a pair of diagonally crossing levers arranged in a vertical plane at one longitudinal side of the vehicle with their central portions hinged together, their upper ends loosely connected to the body, and a second pair of levers arranged in a vertical plane at the opposite longitudinal side of the vehicle with their central portions hinged together, their upper ends loosely connected to the body, and their lower ends loosely connected to the truck, hinge pins for the central portions of said levers, and springs supported on the hinge pins of the levers with their ends engaging said levers, substantially as and for the purpose set forth.

4. In an equalizing device for vehicles, the combination of a truck, a body, a pair of diagonally crossing levers arranged in a vertical plane at one longitudinal side of the vehicle with their central portions hinged together, their upper ends loosely connected to the body, and their lower ends loosely connected to the truck, a second pair of levers arranged in a vertical plane at the opposite longitudinal side of the vehicle with their central portions hinged together, their upper ends loosely connected to the body and their lower ends loosely connected to the truck, hinge pins for the central portions of said levers, guides for the hinge pins of said levers, and springs supported on the hinge pins of the levers with their ends engaging said levers, substantially as and for the purpose specified.

5. In an equalizing device for vehicles, the combination of a truck, a body, a pair of diagonally crossing levers of unequal length arranged in a vertical plane at one longitudinal side of the vehicle with their central portions hinged together, their upper ends loosely connected to the body and their lower ends loosely connected to the truck, a second pair of levers of unequal length arranged in a vertical plane at the opposite longitudinal side of the vehicle with their central portions hinged together, their upper ends loosely connected to the body and their lower ends loosely connected to the truck, and springs for separating the ends of each of said pairs of levers, substantially as and for the purpose set forth.

6. In an equalizing device for vehicles, the combination of a truck, a body, a pair of diagonally crossing levers arranged in a vertical plane at one longitudinal side of the vehicle arranged with their upper ends loosely connected to the body and their lower ends loosely connected to the truck, a non-revoluble hinge pin for said levers, a guide for said hinge pin, a second pair of levers arranged in a vertical plane at the opposite longitudinal side of the vehicle with their upper ends loosely connected to the body and their lower ends loosely connected to the truck, a non-revoluble hinge pin for hinging together the central portions of said levers, and a guide for said hinge pin, substantially as and for the purpose set forth.

7. In an equalizing device for vehicles, the combination of a truck, a body, a pair of diagonally crossing levers arranged in a vertical plane at one longitudinal side of the vehicle with their central portions hinged together, their upper ends loosely connected to the body, and the lower ends loosely connected to the truck, a second pair of levers arranged in a vertical plane at the opposite longitudinal side of the vehicle with their upper ends loosely connected to the body, and their lower ends loosely connected to the truck, springs for separating said levers, and adjusters for regulating the action of said springs, substantially as and for the purpose specified.

8. In an equalizing device for vehicles, the combination of a truck, a body, a pair of levers extending diagonally across each other with their lower ends mounted on the truck and their upper ends connected to the body, and a spring having a pair of arms engaged with the opposite extremities of one of said levers, substantially as and for the purpose specified.

9. In an equalizing device for vehicles, the combination of a truck, a body, a pair of vertically movable levers extending diagonally across each other with their lower ends mounted on the truck and their upper ends connected to the body, and a guide for the central portions of said levers, substantially as and for the purpose set forth.

10. In an equalizing device for vehicles, the combination of a truck, a body, a pair of diagonally crossing levers arranged in a vertical plane with their upper ends loosely connected to the body and their lower ends loosely connected to the truck, hinge connections for the central portions of each pair of levers, springs mounted upon the outer ends of each of said hinge connections and formed with arms for engaging the opposite extremities of the outer levers of each of said pairs of levers, and springs mounted upon the inner ends of each of said hinge connections and formed with arms for engaging the opposite ends of each of said pairs of levers, substantially as and for the purpose set forth.

11. In an equalizing device for vehicles, the combination of a truck, a body, a pair of vertically movable diagonally crossing levers arranged with their upper ends loosely connected to the body and their lower ends loosely connected to the truck, a non-revoluble hinge connection for the central portion of said levers, a spring supported upon one end of said hinge connection and engaged with one of said levers, a nut on the other end of the hinge connection, a second spring mounted upon said nut and engaged with the other lever, and a guide for said hinge connection, substantially as and for the purpose described.

12. In a vehicle, the combination of a truck, a car or body, an upwardly extending supporting lever having one extremity lengthwisely movable on the car and the other lengthwisely movable on the truck, a second lever crossing the former having one extremity lengthwisely movable on the car and the other lengthwisely movable on the truck, a bolt connecting the central portions of said levers, a spring secured to one end of the bolt and engaged with one of said levers, a spring secured to the opposite end of the bolt and engaged with the other lever, and a guide for said bolt, substantially as and for the purpose specified.

In testimony whereof I have hereunto signed my name, in the presence of two attesting witnesses, at Syracuse, in the county of Onondaga, in the State of New York, this 22d day of June, 1892.

HENRY B. CROSS.

Witnesses:
CLARK H. NORTON,
S. M. BAXTER.